United States Patent
DiFrancesco

(10) Patent No.: US 7,576,830 B2
(45) Date of Patent: Aug. 18, 2009

(54) CONFIGURABLE FLAT PANEL IMAGE TO FILM TRANSFER METHOD AND APPARATUS

(75) Inventor: David DiFrancesco, San Francisco, CA (US)

(73) Assignee: Pixar, Emeryville, CA (US)

( * ) Notice: Subject to any disclaimer, the term of this patent is extended or adjusted under 35 U.S.C. 154(b) by 1666 days.

(21) Appl. No.: 10/638,135

(22) Filed: Aug. 8, 2003

(65) Prior Publication Data

US 2007/0182815 A1   Aug. 9, 2007

Related U.S. Application Data

(63) Continuation-in-part of application No. 10/392,399, filed on Mar. 20, 2003, now abandoned.

(51) Int. Cl.
   *G03B 19/18* (2006.01)
(52) U.S. Cl. ...................................................... 352/44
(58) Field of Classification Search ................... 352/44; 348/209.99, 210.99, 96
   See application file for complete search history.

(56) References Cited

U.S. PATENT DOCUMENTS

| | | |
|---|---|---|
| 3,220,792 A | 11/1965 | Vendig |
| 3,824,336 A | 7/1974 | Gould et al. |
| 3,867,022 A | 2/1975 | Whatley et al. |
| 4,096,530 A | 6/1978 | Plugge et al. |
| 4,305,089 A | 12/1981 | Hosoya |
| 4,473,849 A | 9/1984 | Cool |
| 4,688,104 A | 8/1987 | Wolcott |
| 4,715,683 A | 12/1987 | Gregory et al. |
| 4,752,823 A | 6/1988 | Takahashi et al. |
| 4,754,334 A | 6/1988 | Kriz et al. |
| 4,757,374 A | 7/1988 | Ramsay et al. |

(Continued)

FOREIGN PATENT DOCUMENTS

DE   4211128   10/1993

(Continued)

OTHER PUBLICATIONS

Inoshiro, Kuro5hin, Kuro5hin.org Mission Statement, updated Sep. 10, 2000, http://www.kuro5hin.org/special/mission, printed Jul. 23, 2003, p. 1 of 2.

(Continued)

*Primary Examiner*—William C Dowling
(74) *Attorney, Agent, or Firm*—Townsend and Townsend and Crew LLP; Kenneth R. Allen

(57) ABSTRACT

A method for a film recorder includes displaying a plurality of images on a modified liquid crystal display movably coupled to the film recorder, wherein the modified liquid crystal display panel comprises a liquid crystal display panel with only a single polarizing media layer, disposing a linearly polarizing filter in an optical path of the film recorder, orienting the linearly polarizing filter in a first orientation relative to the modified liquid crystal display panel to thereby configure the film recorder to receive the plurality of images as positive images, and orienting the linearly polarizing filter in a second orientation relative to the modified liquid crystal display panel to thereby configure the film recorder to receive the plurality of images as negative images.

27 Claims, 10 Drawing Sheets

U.S. PATENT DOCUMENTS

| | | | |
|---|---|---|---|
| 4,827,434 | A | 5/1989 | Hanau et al. |
| 4,975,779 | A | 12/1990 | Boudry |
| 4,985,762 | A | 1/1991 | Smith |
| 5,049,927 | A | 9/1991 | Tsushima et al. |
| 5,249,056 | A | 9/1993 | Gunday et al. |
| 5,294,993 | A | 3/1994 | Sable |
| 5,653,522 | A | 8/1997 | Loucks |
| 5,754,184 | A | 5/1998 | Ring et al. |
| 5,771,109 | A | 6/1998 | DiFrancesco |
| 5,841,418 | A | 11/1998 | Bril et al. |
| 5,975,705 | A | 11/1999 | Lee |
| 6,226,033 | B1 | 5/2001 | Glasgow |
| 6,248,448 | B1 | 6/2001 | Lippey et al. |
| 6,262,790 | B1 | 7/2001 | Kinjo |
| 6,283,599 | B1 | 9/2001 | Lin |
| 6,359,676 | B1 | 3/2002 | Treiber et al. |
| 6,535,190 | B2 | 3/2003 | Evanicky |
| 6,642,975 | B2 * | 11/2003 | Chino et al. ............... 349/65 |
| 6,842,194 | B1 | 1/2005 | Sugihara |
| 7,053,921 | B2 * | 5/2006 | Chino ..................... 347/241 |
| 7,053,927 | B2 | 5/2006 | Jones et al. |
| 7,133,020 | B2 * | 11/2006 | Chino et al. ............. 345/102 |
| 7,369,179 | B1 | 5/2008 | Lippman |
| 7,463,821 | B2 * | 12/2008 | DiFrancesco et al. ....... 386/130 |
| 2002/0063963 | A1 | 5/2002 | Whitehead et al. |
| 2002/0163657 | A1 | 11/2002 | Bogdanowicz et al. |
| 2002/0163676 | A1 | 11/2002 | Jones et al. |
| 2002/0167701 | A1 | 11/2002 | Hirata |
| 2002/0171618 | A1 | 11/2002 | Lowles et al. |
| 2003/0038764 | A1 * | 2/2003 | Oehlbeck et al. ........... 345/87 |
| 2003/0086065 | A1 | 5/2003 | Morton et al. |
| 2003/0090733 | A1 * | 5/2003 | Fleck et al. ............... 358/302 |
| 2004/0184762 | A1 * | 9/2004 | DiFrancesco et al. .......... 386/1 |
| 2004/0184763 | A1 * | 9/2004 | DiFrancesco ................ 386/1 |
| 2004/0184765 | A1 * | 9/2004 | DiFrancesco et al. ......... 386/46 |
| 2004/0202445 | A1 * | 10/2004 | DiFrancesco ............... 386/46 |

FOREIGN PATENT DOCUMENTS

| | | |
|---|---|---|
| EP | 0980021 | 2/2000 |
| JP | 60103791 | 10/1985 |
| WO | WO 97/21144 | 6/1997 |

OTHER PUBLICATIONS

MetaFilmCorp.com, Digital Intermediate, The totally digital post production process, http://www.metafilmcorp.com/ei_overview.htm, printed Jun. 23, 2003, p. 1 of 2.

MetaFilmCorp.com, LCD technology, http://www.metafilmcorp.com/metaflash_technology.htm, printed Jun. 23, 2003, p. 1 of 2.

MetaFilmCorp.com, About Us, http://www.metafilmcorp.com/about.htm, printed Jun. 23, 2003, p. 1 of 1.

http://www.metalfilmcorp.com/pictures/april103/metalfsh.jpg, printed Jun. 23, 2003, p. 1 of 1.

SIGGRAPH 2003, High-Dynamic-Range Display System, http://www.siggraph.org/s2003/conference/etech/hdr.html, printed Aug. 19, 2003, p. 1 of 2.

Sony, Sony Global, Press Releases, Sony develops SXRD, a display device capable of generating high resolution, high contrast images of film quality smoothness, http://www.sony.net/SonyInfo/News/Press/200302/03-008E/printed Jun. 27, 2003, p. 1 of 3.

Sunnybrook Technologies, HDR: Displaying the Real World, British Columbia, Canada.

Yourganov et al., Acquiring High Dynamic Range Video at Video Rates, Technical Report, Dept. of Computer Science, York University, May 2001.

European Search Report EP 03 74 7282.

* cited by examiner

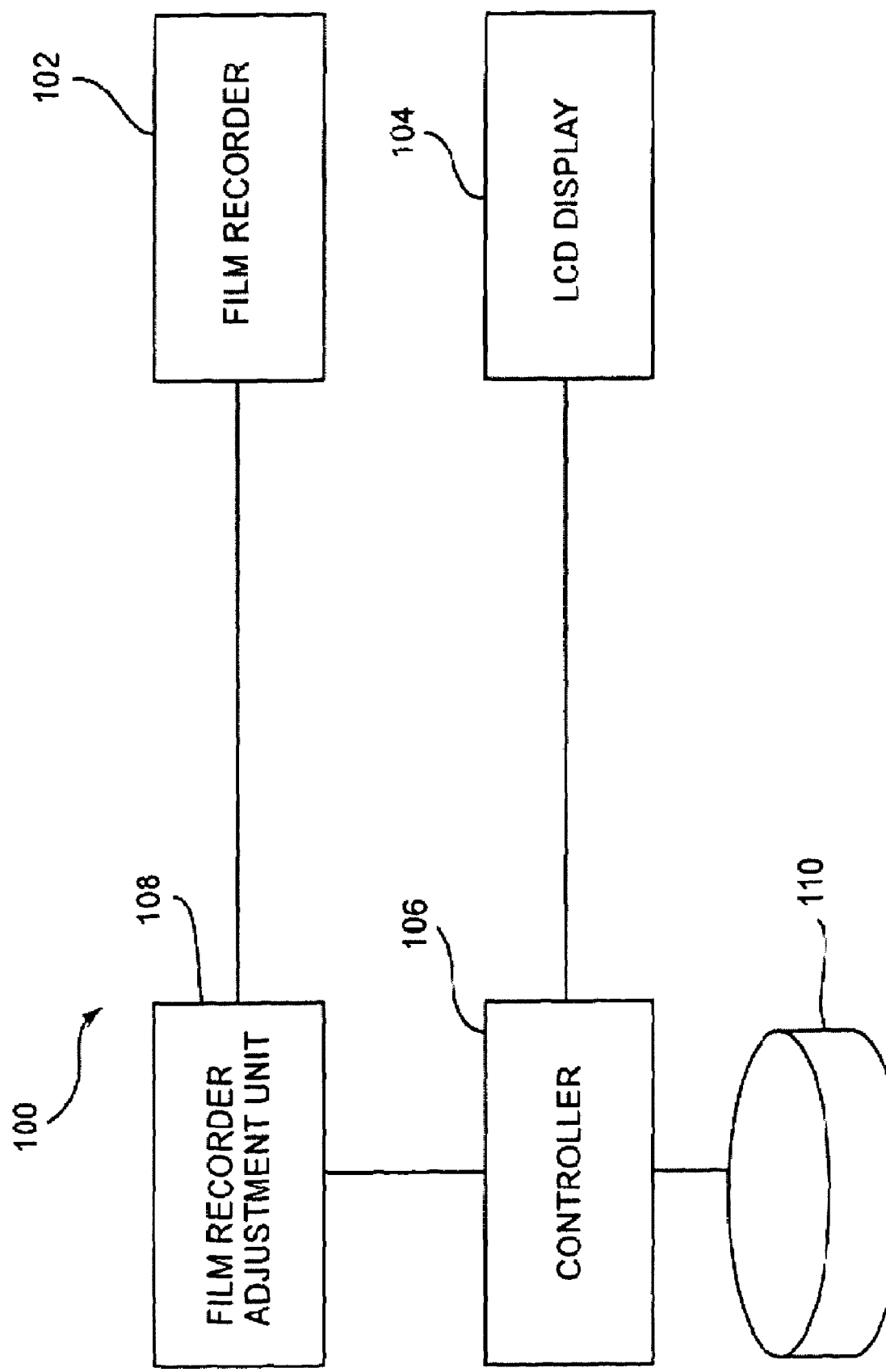

CONFIGURABLE FLAT PANEL IMAGE TO FILM TRANSFER METHOD AND APPARATUS

CROSS-REFERENCES TO RELATED APPLICATIONS

The present invention claims priority and incorporates by reference for all purposes application Ser. No. 10/392,399 filed Mar. 20, 2003 titled Flat Panel LCD and to PCT application No. PCT/US03/11492 filed Apr. 25, 2003 titled Flat Panel Digital Film Recorder. The present invention is also related to and incorporates by reference for all purposes, application Ser. No. 10/637,744 filed Aug. 8, 2003 titled Improved Flat Panel Image to Film Transfer Method and Apparatus and Provisional Application No. 60/493,539 filed Aug. 8, 2003 titled Flat Panel Digital Film Recorder and Method.

BACKGROUND OF THE INVENTION

The present invention relates to image to film transfer. More particularly, the present invention relates to techniques and apparatus for efficient recording of images to film media.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and physical animation techniques.

Drawing-based animation techniques were refined in the twentieth century, by movie makers such as Walt Disney and used in movies such as "Snow White and the Seven Dwarves" and "Fantasia" (1940). This animation technique typically required artists to hand-draw (or paint) animated images onto a transparent media or cels. After painting, each cel would then be captured or recorded onto film as one or more frames in a movie.

Physical-based animation techniques typically required the construction of miniature sets, props, and characters. The filmmakers would construct the sets, add props, and position the miniature characters in a pose. After the animator was happy with how everything was arraigned, one or more frames of film would be taken of that specific arrangement. Physical animation techniques were developed by movie makers such as Willis O'Brien for movies such as "King Kong" (1932). Subsequently, these techniques were refined by animators such as Ray Harryhausen for movies including "The Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment physical animation techniques. For example, physical models could be represented by virtual models in computer memory, and manipulated.

One of the pioneering companies in the computer aided animation (CAA) industry was Pixar Incorporated. Pixar developed both computing platforms specially designed for CAA, and animation software now known as RenderMan®. By moving to CAA, Pixar was faced with additional challenges. One such challenge was how to accurately and effectively transfer CAA images onto film. In response to this problem, Pixar invented a proprietary laser film recording system named Pixarvision™.

Despite these advances, the inventors of the present invention believed that further advances could be achieved in image to film transfer. One such advance was to reduce the amount of time needed to record an image onto frame. Previously, laser film recording could take up to 50 seconds per frame, however with advances in technology, such as Pixarvision™, this time was reduced to about 5 seconds per frame. Because a typical feature-length movie may have approximately 160,000 frames, even at 5 seconds per frame, it would take over nine days straight to transfer the movie to film.

Another such advance was to increase the quality of release prints. As is known in the industry, an original camera print is typically printed to form one or more prints termed "interpositives" from which one or more prints termed "internegatives" from which release prints are made. In the present case, the inventors recognized that if they could reduce the cost of creating an original camera print sufficiently, one or more generation of intermediate could be eliminated. In such a case, the release print would be closer to the original camera print in quality. Currently, as merely an example, a typical film transfer service bureau may charge from $2 to $3 per frame, thus a feature-length movie may cost up to $500,000 per master negative. Further, typical films require a minimum of three master negatives. Because of this high cost, typically three or fewer master negatives are printed.

In light of the above, the inventors of the present invention have realized that it is desirable to make further enhancements in the area of image to film transfer.

BRIEF SUMMARY OF THE INVENTION

The present invention relates to image to optical media transfer. More specifically, the present invention relates to digital image to film transfer. More particularly, the present method relates to new apparatus and techniques for increasing film transfer speed and film transfer quality.

According to one aspect of the invention, a method for a film recorder is disclosed. One technique includes displaying a plurality of images on a modified liquid crystal display movably coupled to the film recorder, wherein the modified liquid crystal display panel comprises a liquid crystal display panel with only a single polarizing media layer, and disposing a linearly polarizing filter in an optical path of the film recorder. The process may also include orienting the linearly polarizing filter in a first orientation relative to the modified liquid crystal display panel to thereby configure the film recorder to receive the plurality of images as positive images, and orienting the linearly polarizing filter in a second orientation relative to the modified liquid crystal display panel to thereby configure the film recorder to receive the plurality of images as negative images.

According to another aspect of the invention, an apparatus for recording images to film media is described. One apparatus includes a liquid crystal display substrate configured to display a plurality of images, wherein the liquid crystal display substrate includes only a single polarizing layer, and a film recorder movably coupled to the liquid crystal display substrate, wherein the film recorder includes a lens having a polarizer coupled thereto, wherein when the polarizer is oriented in a first orientation, the film recorder is configured to receive the plurality of images as positive images, and wherein when the polarizer is oriented in a second orientation, the film recorder is configured to receive the plurality of images as negative images.

According to still another aspect of the invention, a method for an optical media recorder to record a plurality of images displayed on a on a display substrate is described. One technique includes positioning a polarizing filter disposed on a lens of the optical media recorder in a first orientation with respect to an orientation of a polarizing layer on the display substrate, wherein when the polarizing filter is in the first orientation with respect to the orientation of the polarizing layer, the optical media recorder is configured to receive the plurality of images as images in a first polarity. Various techniques include displaying the plurality of images on the display substrate, and thereafter recording the plurality of images as images in the first polarity on an optical media.

According to yet another aspect of the invention, a method for forming a image transfer apparatus is disclosed. One method includes providing a liquid crystal display panel having a first linearly polarizing film disposed on a bottom surface of first transparent media, first transparent electrodes disposed upon a top surface of the first transparent media, a second linearly polarizing film disposed on a top surface of a second transparent media, second transparent electrodes disposed on a bottom surface of the second transparent media, and a liquid crystal media disposed between the first transparent electrodes and the second transparent electrodes. Additionally, techniques may include removing the second linearly polarizing film from the top surface of the second transparent media, and providing a optical media recorder movably coupled to the liquid crystal display panel. The process may also include positioning a linearly polarizing filter in the optical path of the optical media recorder, and orientating a polarizing direction of the linearly polarizing filter relative to the liquid crystal display.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 1A-C illustrate an embodiment of the present invention;

DETAILED DESCRIPTION OF THE INVENTION

Figure 1A:
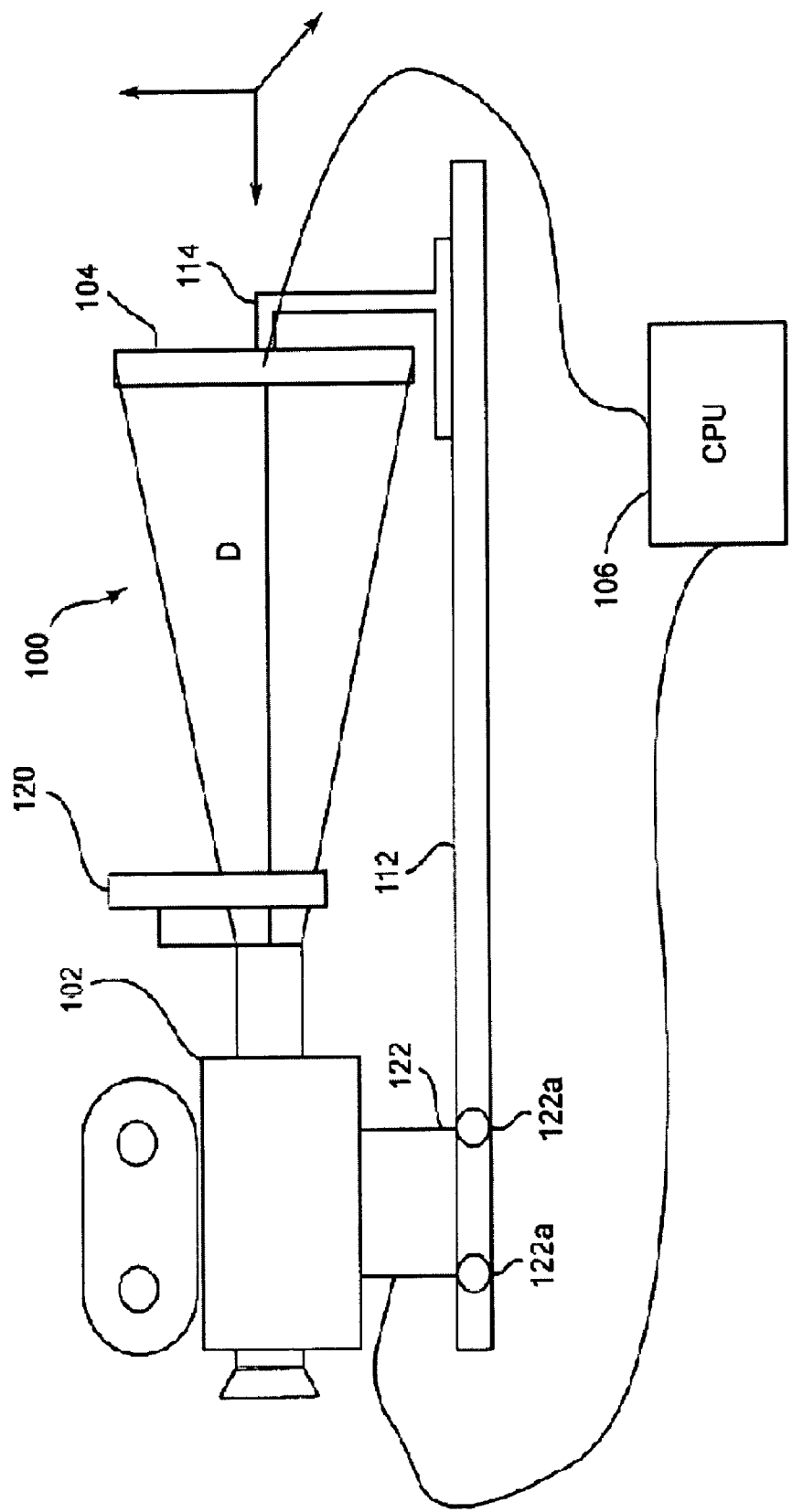
Figure 1C:
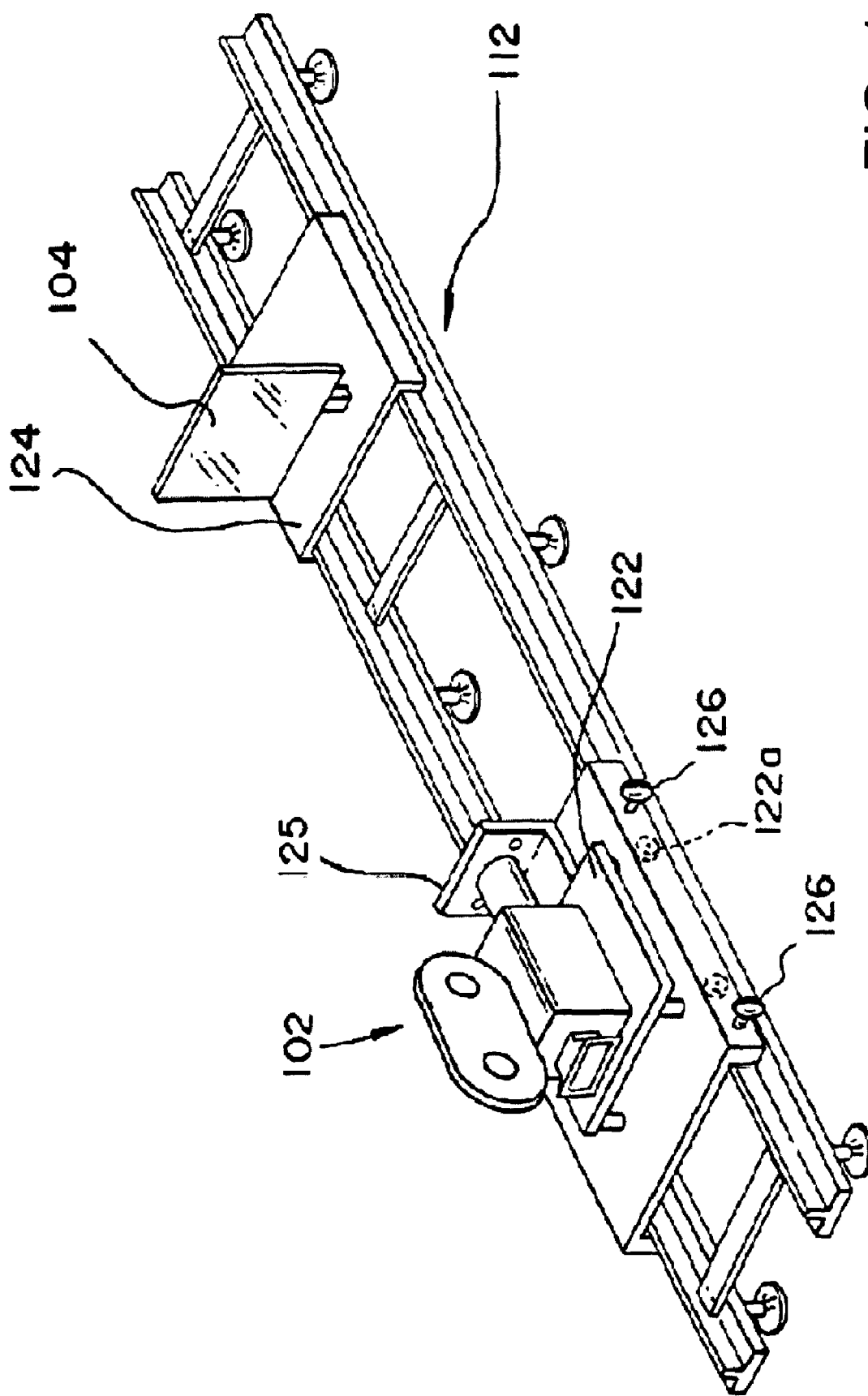

FIGS. 1A-C illustrate embodiments of the present invention. More particularly, FIGS. 1A-C illustrate a digital film recorder system. In FIG. 1A, a system 100 includes an optical recording device 102 (e.g. a film recorder), a display device 104 (e.g. a flat-panel display), a track 112, and a central processing unit (CPU) 106. The track 112 may run in a Z-direction and may include support members such as rails, rods, or the like for attaching film recording device 102 and display device 104 thereto. Devices 102 and 104 may be attached to the track and be moved towards and away from each other with the use of movable platforms, for example. In one embodiment, devices 102 and 104 may be semi-permanently secured to the track by any known device or method. In one embodiment, the positions of devices 102 and 104 are adjustable.

In the present embodiment, film recording device 102 may be any conventional optical recording device, such as a 16-millimeter, 35-millimeter, or 70-millimeter film movie cameras. Further, the optical recording media may be any conventional media, such as film media, or the like. In other embodiments, recording device 102 may be a video camera of any format, such as an HDTV camera, of any resolution, or the like.

In the present embodiment, film recording device 102 is mounted upon a movable platform 122 that is mounted to track 112, with wheels 122a. The movable platform may be motorized and controlled by a control unit or other device, such as CPU 106. Accordingly, the distance "D," a distance between the front of display device 104 and a lens of the film recording device 102 may be adjusted by sliding the movable platform 122 along the track in either direction.

In the present embodiment, cameras used as the film recording device 102 may be auto focus or manual focus cameras. Additionally, such cameras may include an adjustment unit (not individually shown) for adjusting the focal length and aperture size of a lens, media (e.g. film) exposure time, media advancement, and any other conventional adjustable parameters of film cameras. The adjustment unit of the film recording device 102 may also be coupled to CPU 106. Accordingly, CPU 106 may adjust any of the characteristics of the camera remotely, may control the camera motor to advance film, may control the camera shutter, and the like.

Display device 104 may be a thin-film technology flat panel liquid crystal display (LCD) and may be coupled with CPU 106. In one embodiment, CPU 106 is also configure to drive (provide) display device 104 with images. In another embodiment, a separate CPU may be used to drive display device 104. These images are typically provided in digital format, however, the images may also be provided in analog format in other embodiments. In other embodiments, displays built on other display technology are also contemplated.

In one embodiment, display device 104 is based upon a 23-inch thin-film transistor (TFT) active matrix liquid crystal panel, having approximately 4000 by 2500-pixel resolution. In one non-limiting example, such a panel is manufactured by International Display Technology Co., Ltd., Japan, and available through IBM. In another embodiment, display device 104 is based upon a 23" 1920×1200 pixel resolution LCD. In one non-limiting example, such a panel is manufactured by L. G. Philips, and available through Apple computer. In various embodiments, displays 104 are configured to be driven with 24-bit data (16.7 million colors), although in other embodiments, a greater bit-depth may become available. One of ordinary skill in the art will recognize that embodiments of the present invention may use high-resolution displays that currently exist or may use displays and display technologies that will be developed in the future. In contemplated embodiments, display device 104 may be based upon active-matrix (or passive) organic light emitting diode (OLED) technology, DLP digital light technology, LCOS technology, plasma technology, EL technology, or the like. Additional embodiments may include other novel features described in the above-referenced applications such as a display with additional stroboscopic illumination, a display with additional LED illumination, an LCD display pumped with DLP illumination, or the like.

It will be understood by one skilled in the art that many desired effects may be achieved by varying the size of the display, the resolution of the display, the brightness of the display, the distance between the display area of the display and the lens of the recording device, and the like. The camera characteristics of the recording device may be varied to achieve any effect desired. Further, many techniques may also be used to enhance the image displayed on display device 104.

In one example, spatial dithering techniques can be used to effectively increase the number of apparent colors of display device 104. As is known, display devices typically have a limited number of colors that may be reproduced, for example, a display device may support output 256 colors (8-bits) for each primary color component. In one example, spatial dithering techniques may be used to drive two adjacent pixels with a first and second color to give an effective appearance of a third color on the display. In one example, it has been determined that using spatial dithering techniques, the display device can appear to have an effective output of up to 1024 colors (10-bits) for each primary color component.

In operation, if an un-reproducible color for a pixel is desired that lies between two reproducible colors on the display device, pixels of the display device may are assigned the two reproducible colors. In one embodiment, determining which pixel is assigned which one of the two (or more) colors may be random and weighted with the color that is closest to the desired one. When exposed to these display pixels, the film media integrates the colors to form the desired color.

In one example, using a 3480×2400 pixel display and having every four pixels in a square represent a dithered color, the effective optical resolution of the display decreases by approximately half to 1740×1200. The effective resolution is smaller than typically desired for film transfer, accordingly other dithering methods to increase the number of colors recorded by the film may be used in addition to, or instead of spatial dithering.

In another example, temporal techniques can be used to effectively enhance the number of apparent colors of display device 104. In this embodiment, a frame of film media is exposed to a series of images on display device 104. For a particular pixel on display device 104, in the series of images, that value may vary. The values for that pixel may both be greater or lesser in value than the target color. Since the film media integrates the colors, the color recorded at that pixel location may be one display device 104 is not normally able to produce. Accordingly, the apparent bit-depth for each primary color component is effectively increased.

In still other embodiments, combinations of spatial and temporal dithering techniques may be used to increase the number of colors that are recorded onto a film media. Dithering techniques thus effectively increase the number of effective bits per color recorded onto film media. In one embodiment, the increase is estimated to increase the effective bit-depth from 8 bits per color to 10 bits per color, or greater.

In the present embodiment, because even the highest quality display 104 are not completely perpendicular to surface 112, a precision adjustment device 114 may be attached to the rear of display device 104 to adjust the orientation of the display. Adjustment device 114 may also be used as a movable mount for display device 104 to track 112 to allow display device 104 to be moved towards or away from recording device 102. In one embodiment of the present invention, adjustment device 114 may be an XYZ gimbal attached to the rear of display device 104. In this embodiment, the XYZ gimbal includes extremely fine adjustment capabilities should be used to more precisely orient the active display area of display device 104 with the lens of the recording device 102. For example, the gimbal may allow display device 104 to be positioned relative to recording device 102, facing to the right or left (pan), tilting up or down (tilt), rotated clockwise or counterclockwise (roll), and even moving up or down. One having ordinary skill in the art will readily understand that many instruments may be used to help ensure that display device 104 is "flat" relative to recording device 102. Additionally, dithering may be used to achieve relatively flawless effects on large display panels.

In the present embodiment, recording device 102 is focused upon the display portion of display device 104. More specifically, one or more lenses of recording device 102 are adjusted until an image of display device 104 is focused upon the image plane where the film media, or the like, is located. In one embodiment, this may be facilitated by projecting one or more test patterns on the display portion of display device 104. The size and resolution of the image may be adjusted by moving the display device 104 closer or farther away from the film recording device 102 along the track 112. The size of the display device 104 may be adjusted as well. The display portion of display device 104 is located at the focal plane of recording device 102.

In the present embodiment, an integrated controller (e.g., CPU 106) may be used to monitor and/or drive the images being displayed on display device 104. CPU 106 may also be used as well as used to physically adjust recording device 102 and display device 104, as described above. For example, resolution of an image may be changed by changing the distance D between recording device 102 and display device 104, and/or by changing the display area size (image resolution) of the image being displayed on display device 104. In the present embodiment, the appropriate software may be executed or CPU 106 in order to accomplish the described features. In other embodiments, display device 104 may be driven separately from recording device 102. However, in such embodiments, it is still desirable to coordinate the operation of these devices in some way.

FIG. 1B is a block diagram of system 100 according to an embodiment of the present invention. System 100 may include a film recording device 102, a display device 104, a controller 106, a film recorder device adjustment unit 108, and a storage device 110 (e.g., data warehouse, disk farm, etc.). These devices may be configured as already described above with reference to FIG. 1A.

In this embodiment, the display device 104 is coupled with the controller 106. Controller 106 is coupled with the storage device 110 and film recorder adjustment unit 108. The film recorder adjustment unit 108 is also coupled with the film recorder device 102 and is configured to adjust the distance D between the film recording device 102 and the display device 104 and to adjust the camera characteristics of the film recording device 102, such as focal length, focus, etc.

In this embodiment, the controller 106 may include a CPU and is typically configured to control the display of images stored on storage device 110 onto display 104 as well as configured to coordinate and control the film recording device 102 via the film recorder adjustment unit 108. Further, the film recorder adjustment unit 108 may include actuators and motors which may or may not be part of the film recording device 102. Additionally, film recorder adjustment unit controls the advancement of the film, opening and closing of the shutter, etc.

FIG. 1C illustrates an embodiment of the present invention, More specifically, FIG. 1C illustrates a three-dimensional view of one embodiment. Illustrated in FIG. 1C are a track 112, movable platform 122, a recording device 102 mounted thereon, and another movable platform 124 for mounting one or more display devices 104. As shown, a shroud or a shutter mount 125 is provided which may be used in conjunction with the recording device 102 in order to better control exposure.

In the present embodiment, track 112 can include one or more cross member supports and feet. In one embodiment, platform 122 (and/or platform 124) includes one or more tie down hand bolts 126 for securing platform 122 relative to the track 112. Further, one or more wheels 122a may be provided to facilitate movement of platform 122 on track 112. In other embodiments platform 122 may also be laterally adjustable with respect to platform 124.

Figure 2A:
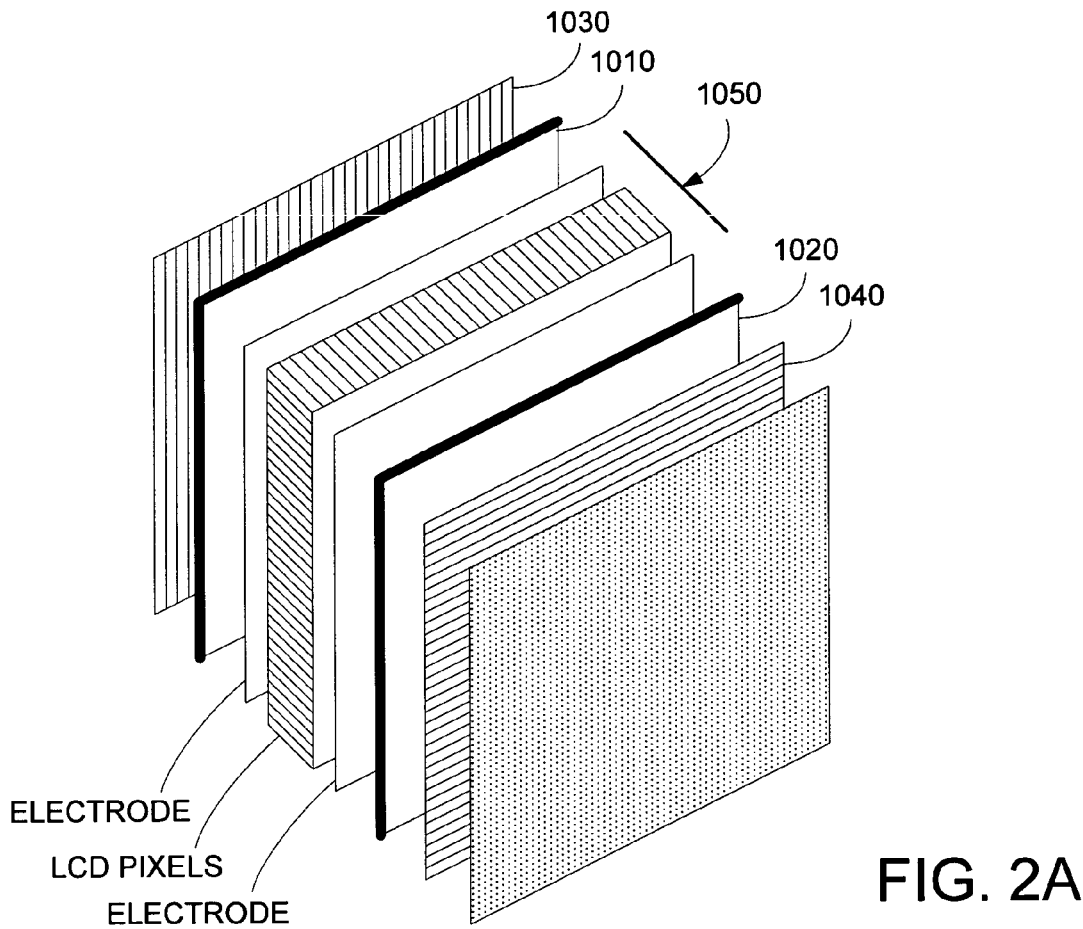
FIGS. 2A-B illustrate additional embodiments of the present invention.
Figure 2B:
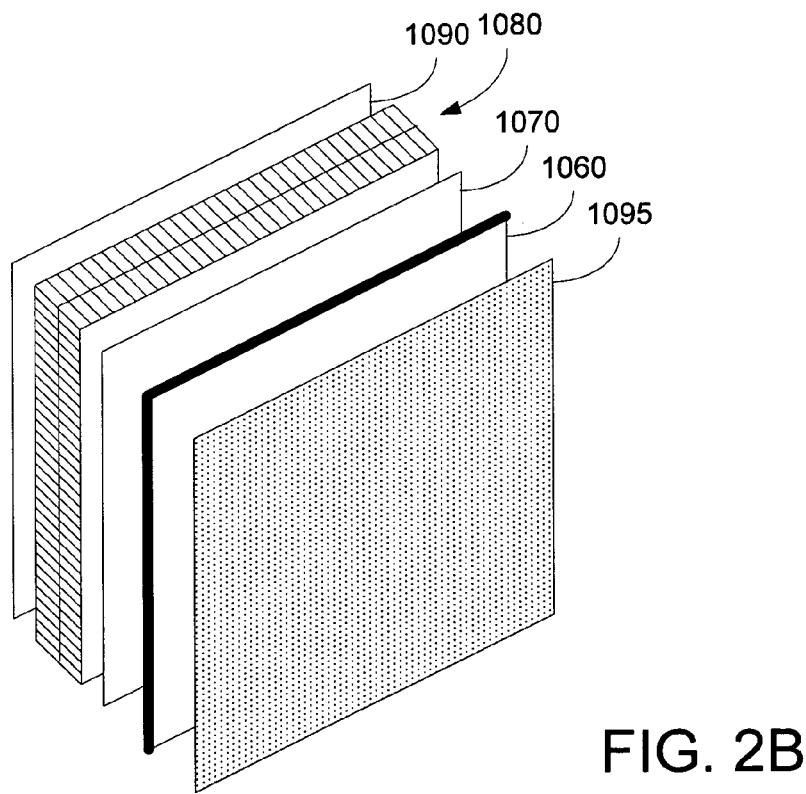

FIGS. 2A-B illustrate additional embodiment of the present invention. In particular, FIGS. 2A-B illustrate construction of a typical flat panel display 104, as illustrated in FIG. 1A.

In one example, flat panel display 104 includes a first substrate 1010 and a second substrate 1020. In various embodiments, these substrates are typically transparent, and are typically made from glass. In other embodiments, other types of media may be used for one or both of the substrates. For example, first substrate 1010 may be fabricated as a layer of silicon, and second substrate 1010 may be fabricated from a doped silicon dioxide layer.

In the present embodiment, sandwiched between first substrate 1010 and second substrate 1020 are liquid crystal cells, or pixels, 1050. As is known, such liquid crystal cells 1050 may include transparent bottom and top electrodes, liquid crystal media, spacers, colored filter material, and the like.

In one embodiment, first substrate 1010 is a glass layer. On the "back" or "bottom" side of first substrate 1010, a first polarizing media 1030 is attached. Further, on the "front" or "top" side of the second substrate 1020, a second polarizing media 1040 is attached. In the present embodiment, polarizing media 1030 and 1040 is typically a film of polarizing media that transmits radiation, such as visible light, in a linear polarization.

In the present embodiment, a linear polarization direction of polarizing media 1030 is oriented orthogonal or perpendicular to a linear polarization direction of polarizing media 1040. For example, polarizing media 1030 may transmit light in a right-left polarization and polarizing media 1040 may transmit light in a up-down polarization, and the like.

In this example, polarizing media 1030 and 1040 may be attached to first substrate 1010 and second substrate 1020, respectively with an adhesive. Typically, the adhesive is relatively transparent when dry. In one embodiment, polarizing media 1030 and 1040 may include self-adhesive surfaces, and in another embodiment, an external adhesive is used.

In this embodiment, polarizing media 1040 may also include anti-reflective and/or anti-glare properties. For example, a surface of the polarizing media 1040 away from the top side of the second substrate 1020 may include a finely roughened surface so as to reduce reflections and/or glare. In the present embodiment, the feature size of the roughened surface is typically much smaller than a pixel size.

In another example, an anti-reflective, anti-glare layer, a retardation layer, or the like may be disposed upon polarizing media 1040. Such layers may also be self-adhesive, deposited directly upon the polarizing media 1040 (anti-reflective coating (ARC)), require an external adhesive, or the like.

In one embodiment, flat panel display 104 may be based upon a 23" diagonal, cold cathode fluorescent light, panel having a resolution of 1920 horizontal by 1200 vertical pixels by 24-bits, manufactured by LG Philips. One such monitor based upon this panel is available from Apple Computer. In another embodiment, flat panel display 104 may be based upon a 23" diagonal panel having a resolution of about 3480× 2400 pixels manufactured by International Display Technology Co., Ltd., Japan. One such monitor based upon this panel is available from IBM.

In other embodiments of the present invention, monitors based upon panels with similar resolutions or higher resolutions can be used. It should be understood that later developed monitors having a greater resolution, based upon later developed display technologies, or the like are all considered within the scope of contemplated embodiments. Accordingly, the embodiments disclosed herein are merely illustrative, and should not be considered as limiting the scope of the claimed invention.

FIG. 2B illustrates another embodiment of the present invention.

In another example, flat panel display 104 includes a first substrate 1060. In various embodiments, first substrates 1060 is typically transparent, and may be made from glass, Mylar, poly hexylthyiophene, or the like. Typically a transparent electrode 1070, such as ITO, is disposed on the "back" side of first substrate 1060. Conventional OLED pixels 1080 including hole-injection material, electron-transport material, and organic emitters is then coupled to transparent electrode 1070.

In some embodiments, OLED pixels 1080 are sandwiched between transparent electrode 1070 and a patterned electrode layer 1090. In embodiments of the present invention, patterned electrode layer 1090 may or may not be fabricated upon a second substrate. In some embodiments the second substrate may be a silicon-based such as glass, amorphous silicon, or the like.

In FIG. 2B, an anti-reflective, anti-glare layer ("frosted" layer), a retardation layer, or the like 1095 maybe disposed upon the "front" side of first substrate 1060. Such layers may also be self-adhesive, deposited directly upon the first substrate 1060 (anti-reflective coating (ARC)), require an external adhesive, or the like.

High resolution embodiments of OLED displays are not yet commercially available. However, after studying engineering samples, the inventor believes that in light of the present disclosure, embodiments can easily be adapted to work with OLED displays.

The inventors have discovered that capturing images with film recording device 102, an optical recorder, from flat panel display 104 has some additional limitations, over and above the problems and solutions detailed in the preceding figures and specification. One such limitation is that images received by optical recorder 102 may include undesired optical distortions.

In the image to film capture embodiments described above, the inventors have recognized that even small optical distortions have a significant impact in the quality of the film images. As an example, the LG Philips panel has a display size of approximately 19.5 inches by approximately 12 inches, and the images captured from the panel will be projected onto a theater screen. Current theater screens typically range from 30' across and 20' high up to 60' across and 30' high. Accordingly, the images captured from the panel may be magnified from 20 to 30 times, or greater.

Some optical imperfections or defects on a flat panel display are visible or noticeable to typical users of flat panel displays. However, it is believed that some optical imperfections or defects on a flat panel display may not be visible or noticeable to typical users of flat panel displays. Such defects are typically characterized as coherent (definite) patterns that are stationary and pronounced (apparent). When an image on a screen is panned up or down, such as is common with movies, such stationary defects are more perceptible to a trained eye. Because, the flat panel displays are being used herein specifically for displaying images and because defects will be greatly magnified, the inventors have determined that such apparent defects should be reduced. It is not believed that any prior art have considered the new and novel problems discovered herein, much less discovered the new and novel solutions herein.

After careful investigation, the inventor believes that one source of the undesired optical distortions is associated with the addition of layers on top of the top substrate. More specifically, the inventor believes that one or more of the following can introduce undesired optical distortions to the image produced by pixels 1050: polarizing media 1040, anti-glare properties, anti-reflective coatings, adhesive materials, and the like. For example, as disclosed above, polarizing media 1040 may have a front surface that is diffuse similar to frosted glass, to reduce reflections for a viewer. As another example, an adhesive layer used to secure an anti-glare layer to a substrate may include small air-bubbles, streaks or the like that act as light diffusers. Some examples of defects include streaks in various directions and in various widths. For example, streaks may vary from 1 inch or less to up to one-third or one half the screen width or greater, and may run top-to-bottom, left-to-right, diagonal, or the like. In embodiments of the present invention, defects of any characteristic are contemplated.

In light of the above, the inventor has developed additional embodiments to address these problems. Specifically, on one case, the inventors have discovered that optical techniques can be used to help reduce the optical defects when recording images to film. Other embodiments may include digital techniques to reduce optical defects. In still other embodiments, combinations of digital adjustment and optical adjustment techniques can both be performed.

Figure 3A:
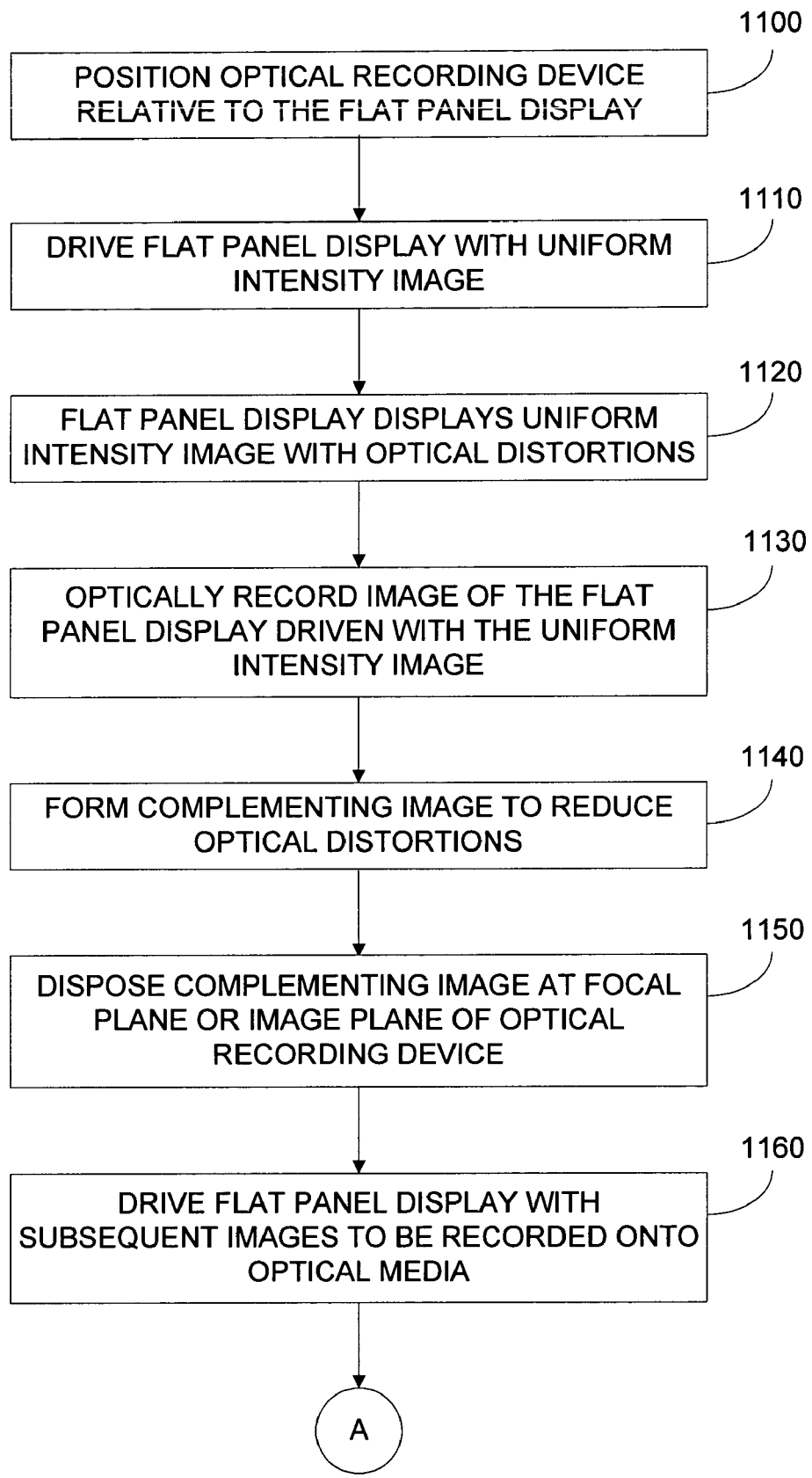
FIGS. 3A-B illustrate a flow diagram according to an embodiment of the present invention.
Figure 3B:
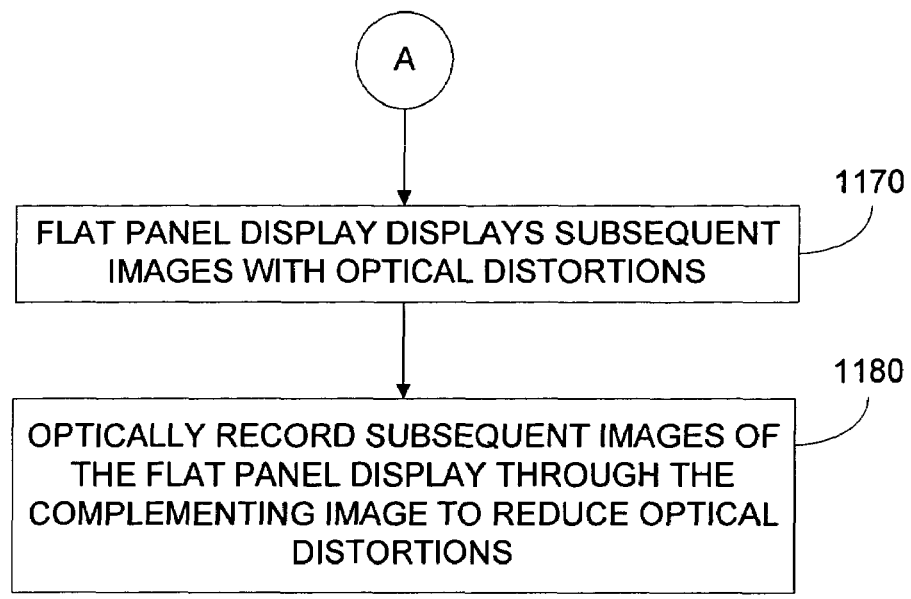

FIGS. 3A-B illustrates a flow diagram according to an embodiment of the present invention. In particular, FIGS. 3A-B illustrate a method for reducing the undesired optical distortions.

Initially, film recording device 102 is positioned with respect to flat panel display 104 to enable film recording device 102 to capture the entire display portion of flat panel display 104, step 1100. Next, flat panel display 104 is driven from CPU 106 with a first pre-determined image, step 1110. In one embodiment, the predetermined image is an image with uniform output pixel values, for example, where all pixels are turned on. In various embodiments, all of the pixels are driven to a uniform brightness, for example, at their maximum value, e.g. R=256, G=256, B=256; or at any other pre-determined value, e.g. R=128, G=128, B=128.

In another embodiment, flat-panel display can be driven with a series of pre-determined images corresponding to primary color component. For example, first R=250, G=0, B=0; then R=0, G=250, B=0; then R=0, G=0, B=250. In these embodiments, the following steps may be repeated for each respective color component.

In the present embodiment, while flat panel display 104 is driven with uniform output pixel values, flat panel display 104 displays a image that includes optical distortions, step 1120, such as those described above. For example, the image may correspond to the pre-determined image that is blurred slightly because of the anti-glare diffuse layer or the adhesive layer, or the like.

In one embodiment, film recording device 102 captures the image displayed on flat panel display 104, step 1130. Typically film recording device 102 exposes the image to one or more frames of film media, although any photo-sensitive, or radiation-sensitive media may also be used. These steps may be repeated in embodiments where color components are separately excited.

Next, the exposed frames are developed, and a complementing image is produced, step 1140. As will be illustrated below, the complementing image will be used to help reduce optical distortions in subsequent images recorded onto film media. In one embodiment, the complementing image may be enlarged to be approximately the same size of the display area of flat panel display 104, for example 23" diagonal. In another embodiment, the complementing image will be kept as the same size.

Figure 4A:
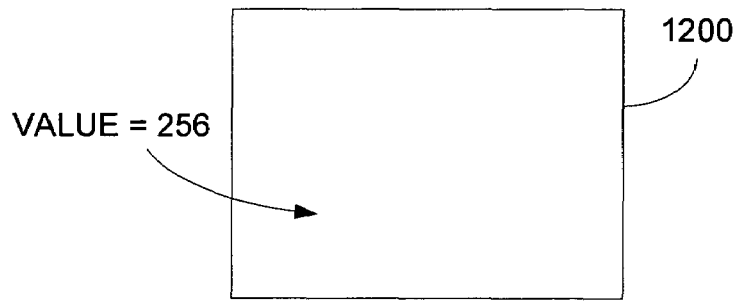
FIGS. 4A-D illustrate an example of an embodiment of the present invention.

FIGS. 4A-D illustrate an example of an embodiment of the present invention. FIG. 4A illustrates an "ideal" image 1200 that should be recorded to a frame of film media without optical distortions. In this embodiment, this should correspond to the pre-determined image. For example, ideal image 1200 may be an image that is uniform in gray scale value and color.

Figure 4B:
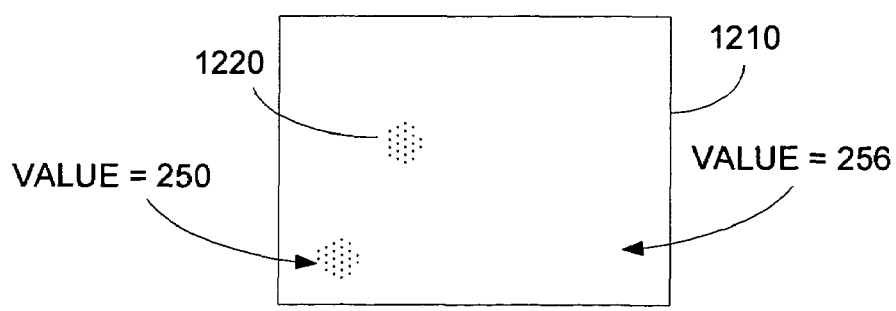

In this example, FIG. 4B illustrates an image 1210 on a frame of film media including optical distortions 1220 with respect to ideal image 1200. In this example, ideal image 1200 may have a uniform value of 256 or each color component. In contrast, image 1210 may have a uniform value of 256, but optical distortions 1200 have a value of 250.

Figure 4C:
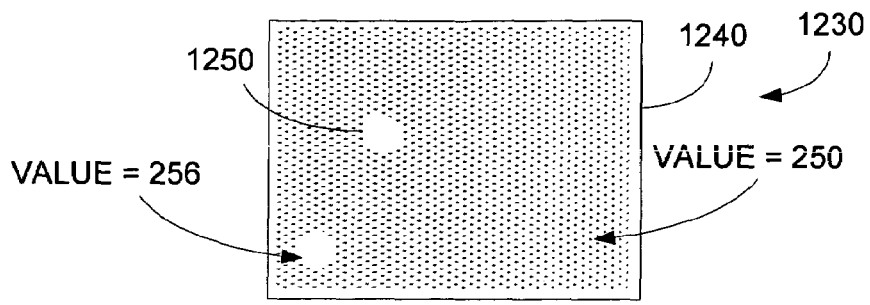

In the present example, FIG. 4C illustrates an example of a complementing image 1230 formed in response to image 1210 in FIG. 4B. In this example, complementing image 1230 includes a region 1240 that has a uniform value, and regions 1250 at a different value. Using the example in FIG. 4B, region 1240 may have the value of 250, and regions 1250 may have the value of 256. As will be illustrated below, the values of complementing image 1230 approximately complement the affect of the optical distortions.

Returning to FIGS. 3A-B, in one embodiment, the complementing image, is typically disposed in or near a focal plane of film recording device 102, e.g. directly in front of flat panel display 104, step 1150. This embodiment assumes the complementing image is enlarged, as discussed above, and placed "in front" of a lens of film recording device 102. In another embodiment, the complementing image is kept as the same size as the film media, and is disposed at the image plane of film recording device 102, i.e "behind" the lens of film recording device. At this stage in the process, film recording device 102 is configured to optically reduce the optical distortions described above.

Next, flat panel display 104 is driven with one or more frames of image data, for example, frames of a movie, step 1160. In response, flat panel display 104 displays the images, step 1170. These images will typically exhibit the same type of optical distortions characterized above.

In one embodiment, these images are focused by one or more focusing elements of film recording device to the focal plane. The image is passed through the complementing image, before being exposed to the film media, step 1180. As a result of this process, the frames of image data are recorded onto the film media with a reduced optical distortion.

Figure 4D:
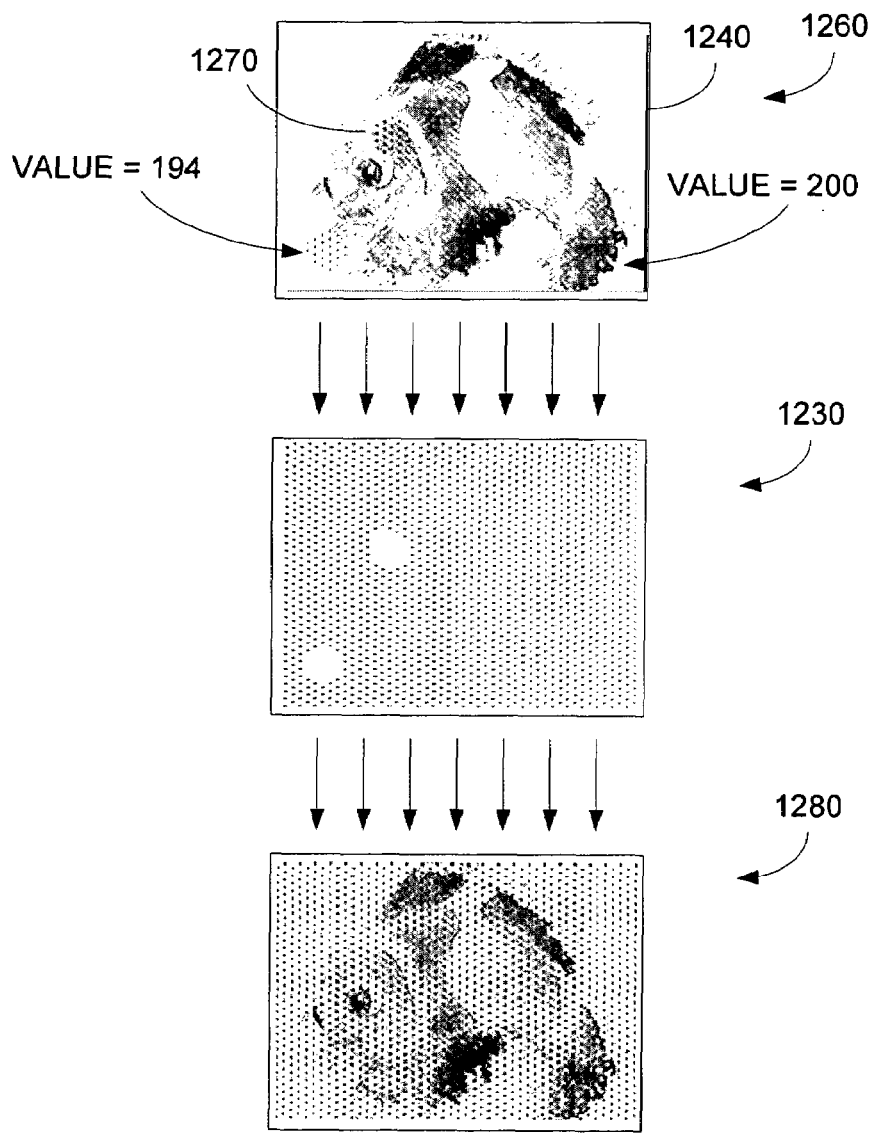

As illustrated in the example in FIG. 4D a subsequent image 1260 that includes optical distortions 1270 is received. In one example, subsequent image 1260 has a grayscale value of 200, with optical distortions 1270 at value 194. Exposing subsequent image 1260 through the complementing image 1230, produces image 1280. In this example, image 1280 may have a uniform grayscale value of about 200. In other examples, the subsequent image 1260 may be a color image.

In the present embodiment, an additional step of increasing the exposure time, increasing the amount of illumination of flat panel display 104, or the like may be necessary because of light attenuation due to the addition of the complementing image at the focal plane.

In other embodiments of the present invention, an optical distortion may be determined for each component color. For example, an optical distortion is characterized for a red channel, blue channel, and a green channel. In embodiments of the present invention, the optical distortions may bias one or more colors. In such a case, a composite complementing image may be formed by combining complementing images from each color component. If there is a channel bias, when viewed, the composite complementing image may illustrate the color bias. Subsequent images acquired through the complementing image will thus be corrected for color-based optical distortions.

In additional embodiments, display driver compensating techniques are also envisioned to reduce optical defects. In such embodiments, before subsequent images are sent to drive the flat panel display, they will be adjusted digitally, for example, combined with a digital compensation image. In such embodiments, the digital compensation image may be captured with an optical sensor, such as a CCD. Such a CCD should have a resolution at least double than the resolution of the flat panel display in each direction. In other embodiments, the digital compensation image may be determined by scanning and processing the image recorded in step 1130, above. By recording the image in step 1130 onto film and digitizing the result, it is believed that the digital compensation image would be more accurate. In other embodiments, combinations of digital compensation and optical adjustment techniques can both be performed to reduce any optical distortion.

Figure 5A:
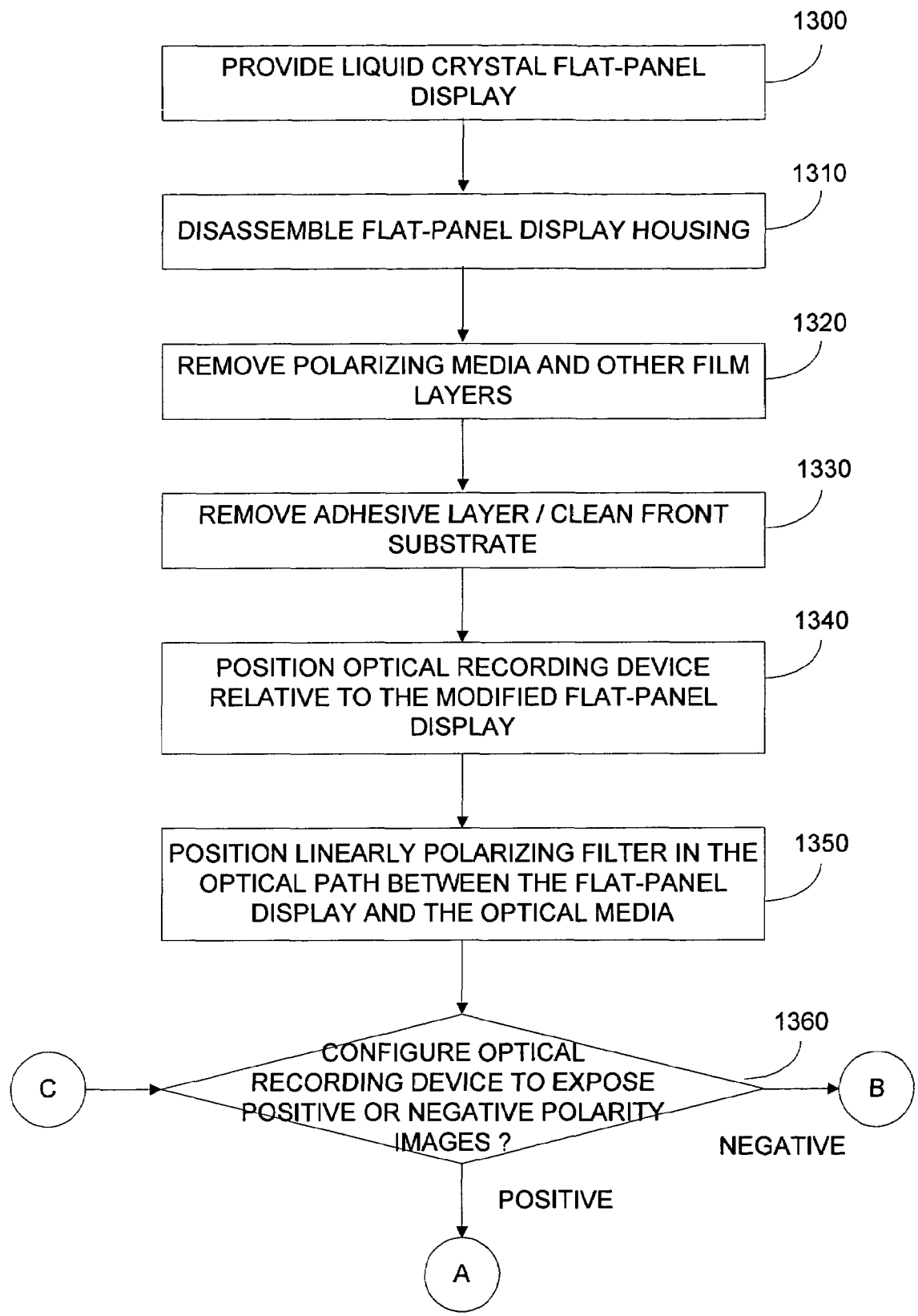
FIGS. 5A-B illustrates a flow diagram according to an embodiment of the present invention.
Figure 5B:
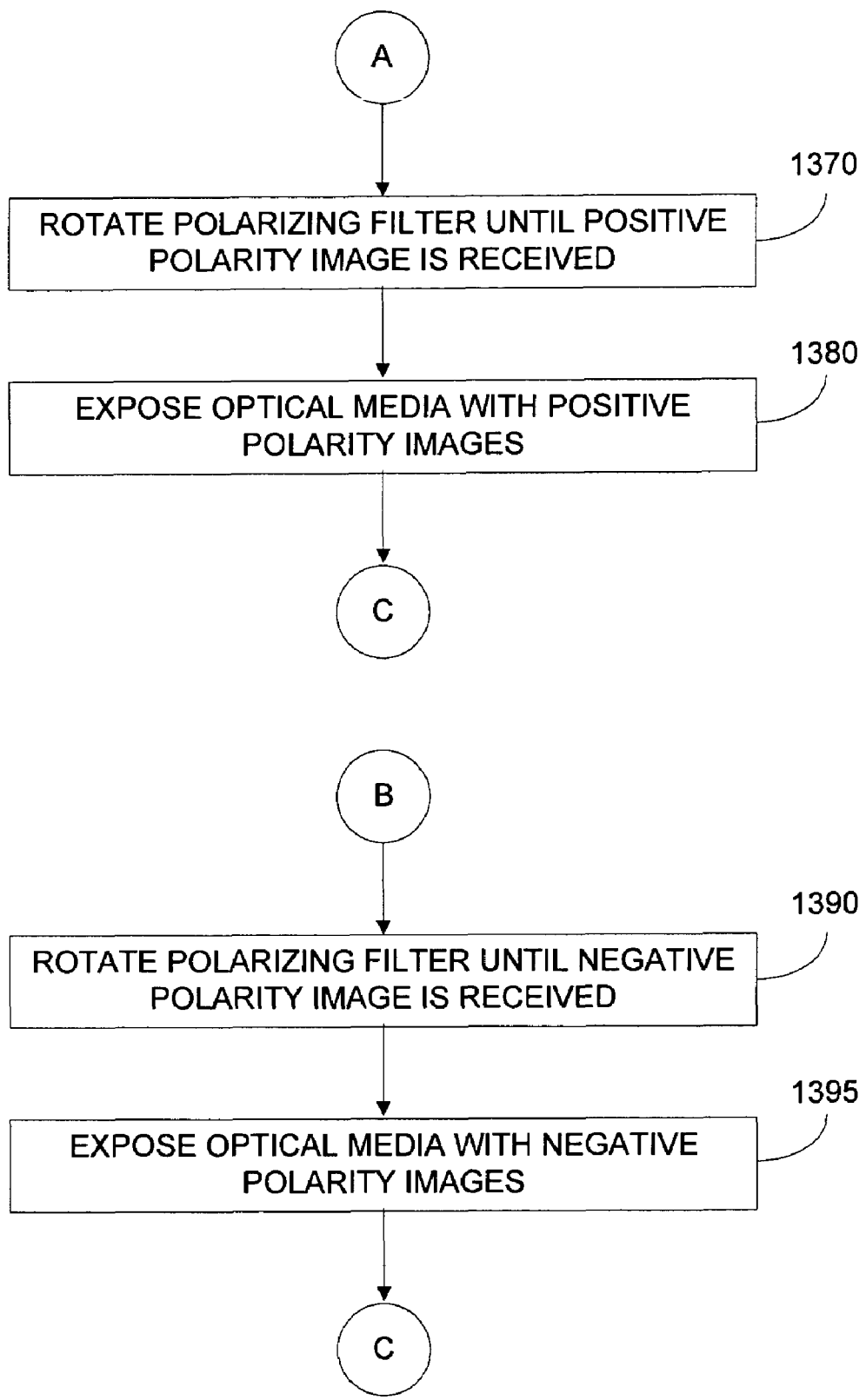

FIGS. 5A-B illustrate a flow diagram according to an embodiment of the present invention. In particular, FIGS. 5A-B illustrate an alternative method for reducing the undesired optical distortions.

Initially, flat panel display 104, is provided, step 1300. As described above in FIG. 10, a typical flat panel display includes a number of layers, including polarizing media 1040 adhered to display substrate 1020. Further, polarizing media 1040 may have an anti-glare feature, and/or additional layers disposed on top of it.

In this embodiment, flat panel display 104 is typically disassembled or removed from its plastic or metal housing, step 1310. This may be done with care, with custom or special tooling.

Next, polarizing media 1040 is removed from display substrate 1020, step 1320. In one embodiment, polarizing media 1040 is typically a film or layer of polarizing material disposed within a plastic sheet, or the like. In such a case, removing polarizing media 1040 may be done by physically pulling upon the plastic sheet. It is contemplated that this step may remove all layers on top of display substrate 1020.

In one embodiment, after removal of polarizing media 1040, display substrate 1020 may still have a residual adhesive layer. This layer is removed, and/or display substrate 1020 is cleaned, step 1330. The inventor tested a wide variety of cleaners and solvents in determining a solution necessary to clean the adhesive layer. In this example, to remove the adhesive layer from display substrate 1020, the inventor has discovered that a solution including propanol and Glycol ethers is suitable for removing adhesive and cleaning display substrate 1020. One such solution is marketed under the name "Expo White Board Cleaner."

Next, film recording device 102 is provided and positioned relative to the modified flat panel display (flat panel substrate) typically in a manner described above, step 1340. As disclosed above, film recording device 102 is one type of optical media recorder including one or more camera lenses depending upon specific configuration.

In the present embodiment, a linearly polarizing filter is coupled to the front of the camera lens, step 1350. In embodiments of the present invention, the linearly polarizing filter may be placed in virtually any location on the optical path between the flat panel display 104 and film media in film recording device 102. For example, the linearly polarizing filter may be placed adjacent to an image plane, may be placed in front or in back of a shutter of film recording device 102, may be placed at the focal plane, or the like. In one embodiment, the linearly polarizing filter is positioned as a filter in front of the lens.

In one embodiment of the present invention, the linearly polarizing filter is typically freely rotatable around the optical axis of the camera lens such that the direction of polarization can be freely selected. Examples of a linearly polarizing filter are Mounted Linear Glass Polarizing Filters available from Edmund Industrial Optics, Royln Optics, Hiliopan, CVI Laser Corporation, or the like. In another embodiment, the polarizing filter may be in a fixed position, thus the direction of linear polarization will be in a fixed direction.

As illustrated in FIGS. 5A-B, a determination is then made as to what polarity of images will be recorded onto the film media, step 1360. More specifically, a determination is made by the user whether to record positive images onto film media or to record negative images onto film media. In other embodiments of the present invention, this step need not be performed. Instead, the system may be pre-configured to record only positive images or to record only negative images. This may be facilitated by having the polarizing filter be in a fixed position, as described in one embodiment, above.

In the case where the system is to record positive images, the linearly polarizing filter is rotated until a positive image is received by the film media, step 1370. This can he determined by, for example, looking through a viewfinder of film recording device 102 and rotating and adjusting the polarizing filter until a positive image is viewed and is vivid in appearance. In this position, the linear direction of polarization of the linear polarizing filter will be oriented approximately 90 degrees from the linear direction of polarization of polarizing media 1030. Further, the linear direction of the polarization of the linear polarizing filter will be oriented in approximately the same direction as the linear direction of polarization of polarizing media 1040. In this embodiment, the system is thus configured to record positive polarity images to film media.

In the present embodiment, subsequent images output to the modified flat panel display are exposed to the film media as positive images, step 1380. This "camera positive" may also be used as an "interpositive" from which master negatives for release prints can be made. In the case where the system is to record negative images, the linearly polarizing filter is rotated until a negative image is received by the film media, step 1390. This can be determined by, for example, looking through a viewfinder of film recording device 102 and rotating and adjusting the polarizing filter until a negative image is viewed and is vivid in appearance. In this position, the linear direction of polarization of the linear polarizing filter will be oriented approximately in the same direction as the linear direction of polarization of polarizing media 1030. Further, the linear direction of the polarization of the linear polarizing filter will be oriented approximately orthogonal to the linear direction of polarization of polarizing media 1040. In this embodiment, the system is thus configured to record negative polarity images to film media.

In the present embodiment, subsequent images output to the modified flat panel display are exposed to the film media as negative images, step 1395. This "original negative," digital duplicate negative "dupe" or master negative may also be used an "internegative" from which "release prints" can be made.

The inventor has discovered that the ease of reconfiguring the system above, to record positive images or negative images to film media is unprecedented. For example, the process above may be repeated, as illustrated in FIGS. 5A-B, to configure the system from recording positive images to recording negative images to film media, or to configure the system from recording negative images to recording positive images to film media.

Figure 6:
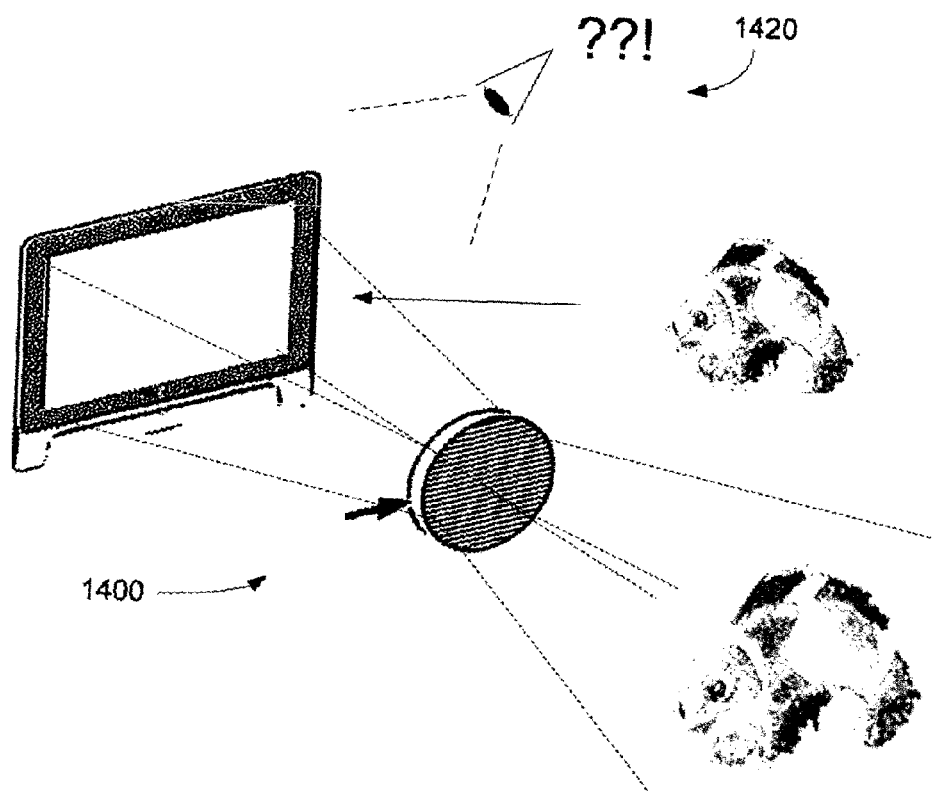
FIG. 6 illustrates an embodiment of the present invention.
Figure 6:
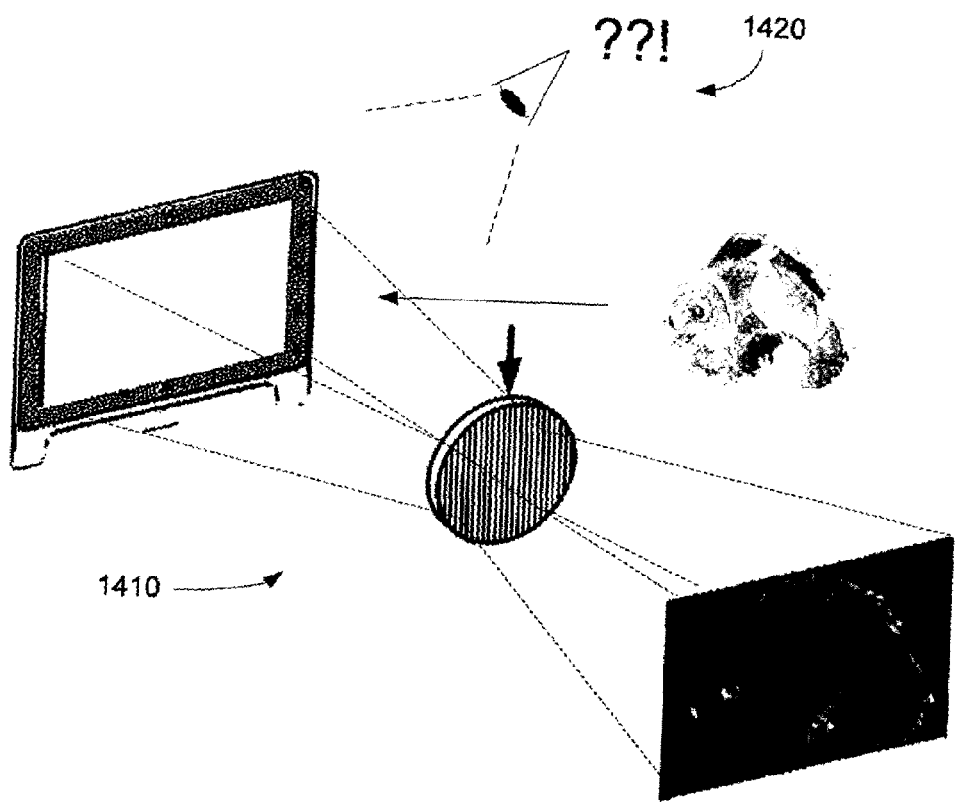

FIG. 6 illustrates an embodiment of the present invention. In a first configuration 1400, the system is configured to expose film media to a positive polarity image. Next with a simple turn of the linear polarizing filter, the system is a second configuration 1410, and configured to expose film media to a negative polarity image.

In the foregoing specification, the invention has been described with reference to specific exemplary embodiments thereof. Many changes or modifications are readily envisioned. In light of the above disclosure, one of ordinary skill in the art would recognize that any number of applications of the above concepts are possible. For example, various embodiments of flat panel displays are contemplated such as LCD, OLED, Plasma, EL, and the like; various supplemental illumination sources are contemplated, such as xenon flash, argon flash, led, and the like; various positioning mechanisms are contemplated, such as movable platform on a track, gimbaled mechanism, and the like.

In other embodiments of the present invention, the removal of film or layers on top of the front substrate may simply be removed to increase image quality. In the case of a LCD panel, this removes the front polarization layer thus requiring compensation, as described in FIGS. 5A-B. However in the case of OLED, Plasma, and other types of display without a polarizer, images may be directly acquired by the film recording device.

In the above embodiments, it is contemplated that the amount of time required to record an image from the flat panel display to the film media may be on the order of one second. In other embodiments where additional lighting embodiments are provided, the exposure time may be reduced further. In contrast, previous laser film recorders required exposure times of five or ten seconds, or greater. Accordingly, the recording process time is advantageously reduced.

In embodiments of the present invention, because the film recording process is reduced, users now have ability to directly create interpositive or internegative images not only camera negatives. The practical implications are that fewer film transfer processes or dupes are required between the exposed film media and the release print. Accordingly, release prints will have better quality by at least one or two generations, thereby increasing the quality of the release print and audiences' theater experience.

In embodiments of the present invention, the inventors have determined that other advantages are provided. In the present embodiment, when a front polarizing film is removed from the flat panel display, to a casual observer, an image displayed on the flat panel display will disappear. This is because the human eye cannot typically distinguish between radiation polarization. More specifically, without the front polarizing film, a user cannot distinguish between linear polarization in an up-down direction and a left-right direction, for example.

Accordingly, images output by the modified flat panel display cannot be seen to an unaided user. An example of this is illustrated in FIG. 6 where film media may be recorded however a casual observer 1420 cannot see what is being recorded on the flat panel display without assistance.

The inventor has recognized that this effect has practical advantages. One such advantage is a security function. For example, in an embodiment, a computer-image to film transfer is performed by an outside service organization. In such a case, the service personnel can configure the system in the manner described above, and can monitor the film transfer process, however they cannot actually view the images from the modified flat panel display. The secrecy of the film is thus more easily preserved, which is very important for blockbuster movies. Because the images cannot be easily viewed from the modified flat panel display, embodiments of the present invention can reduce unauthorized or pirated copies of a feature during the image to film transfer.

In another embodiment, personnel monitoring the transfer process may be authorized to view a restricted images or a set of images from the feature. In such cases, these personnel may be issued special Polaroid glasses (linearly polarized glasses) during such times, so they can directly view the image on the modified flat panel display.

Embodiments of the present invention may be applied to any type of image that may be displayed on a flat panel monitor. For example, the images may be computer generated, the images may be a combination of computer generated and live action, the images may be derived from any number of video sources such as 720i (30 fps), 720p (24 or 60 fps), 1080i (30 fps), 1080p (24 or 60 fps), or the like. Accordingly, the concepts disclosed above are extremely valuable in a variety of applications, e.g. military.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a film recorder comprises;
   displaying a plurality of images on a modified liquid crystal display movably coupled to the film recorder, wherein the modified liquid crystal display panel comprises a liquid crystal display panel with only a single polarizing media layer;
   disposing a linearly polarizing filter in an optical path of the film recorder;
   orienting the linearly polarizing filter in a first orientation relative to the modified liquid crystal display panel to thereby configure the film recorder to receive the plurality of images as positive images; and
   orienting the linearly polarizing filter in a second orientation relative to the modified liquid crystal display panel to thereby configure the film recorder to receive the plurality of images as negative images.

2. The method of claim 1 wherein the first orientation and second orientation are orthogonal.

3. The method of claim 1 wherein providing the modified crystal display further comprises:

removing the front polarizing media from a front glass layer of the liquid crystal display panel; and removing adhesive from the front glass layer.

4. The method of claim 3 wherein removing adhesive from the front glass layer comprises applying a solution comprising: isopropyl alcohol ethyl ether, 2-butoxy ethanol.

5. The method of claim 1 further comprising recording the plurality of images as images on film media selected from the group: positive images, negative images.

6. The method of claim 1 wherein positive images on the film media form an interpositive.

7. The method of claim 1 wherein disposing a linearly polarizing filter in an optical path of the film recorder comprises attaching the linearly polarizing filter at a location selected from the group: in front of a shutter of the film recorder, in back of the shutter of the film recorder.

8. An apparatus for recording images to film media includes:

a liquid crystal display substrate configured to display a plurality of images, wherein the liquid crystal display substrate includes only a single polarizing layer;

a film recorder movably coupled to the liquid crystal display substrate, wherein the film recorder includes a lens having a polarizer coupled thereto, wherein when the polarizer is oriented in a first orientation, the film recorder is configured to receive the plurality of images as positive images, and wherein when the polarizer is oriented in a second orientation, the film recorder is configured to receive the plurality of images as negative images.

9. The apparatus of claim 8 wherein the film recorder is configured to record the positive images onto film media when the polarizer is oriented in the first orientation.

10. The apparatus of claim 8 wherein the film recorder is configured to record the negative images onto film media when the polarizer is oriented in the second orientation.

11. The apparatus of claim 8 wherein the first orientation is perpendicular to the second orientation.

12. The apparatus of claim 8 wherein the polarizer comprises a linear polarizer;

wherein the single polarizing layer comprises a linear polarizer having a first orientation; and wherein the first orientation of the polarizer is orthogonal to the first orientation of the polarizing layer.

13. The apparatus of claim 8 wherein the second orientation of the polarizer is aligned with the first orientation of the polarizing layer.

14. A method for an optical media recorder to record a plurality of images displayed on a display substrate comprises:

positioning a polarizing filter disposed on a lens of the optical media recorder in a first orientation with respect to an orientation of a polarizing layer on the display substrate, wherein when the polarizing filter is in the first orientation with respect to the orientation of the polarizing layer, the optical media recorder is configured to receive the plurality of images as images in a first polarity;

displaying the plurality of images on the display substrate; and thereafter recording the plurality of images as images in the first polarity on an optical media.

15. The method of claim 14 further comprising:

repositioning the polarizing filter disposed on the lens of the optical media recorder from the first orientation with respect to the orientation of the polarizing layer to a second orientation with respect to the orientation of the polarizing layer, wherein when the polarizing filter is in the second orientation with respect to the orientation of the polarizing layer, the optical media recorder is configured to receive the plurality of images as images in a second polarity, wherein the first orientation is orthogonal to the second orientation;

displaying the plurality of images on the display substrate; and thereafter recording the plurality of images as images in the second polarity on an optical media.

16. The method of claim 14 wherein the first polarity is selected from the group: positive, negative.

17. The method of claim 14 wherein the optical media comprises film media.

18. The method of claim 17 wherein recording the plurality of images as images in the first polarity on the film media comprises creating an intermediate print selected from the group: interpositive, internegative.

19. The method of claim 17 further comprising printing a copy of the film media.

20. The method of claim 19 wherein the first polarity is positive; and wherein printing the copy of the film media comprises printing an internegative.

21. A method for forming a image transfer apparatus comprises:

providing a liquid crystal display panel having a first linearly polarizing film disposed on a bottom surface of first transparent media, first transparent electrodes disposed upon a top surface of the first transparent media, a second linearly polarizing film disposed on a top surface of a second transparent media, second transparent electrodes disposed on a bottom surface of the second transparent media, and a liquid crystal media disposed between the first transparent electrodes and the second transparent electrodes;

removing the second linearly polarizing film from the top surface of the second transparent media;

providing a optical media recorder movably coupled to the liquid crystal display panel;

positioning a linearly polarizing filter in the optical path of the optical media recorder; and orientating a polarizing direction of the linearly polarizing filter relative to the liquid crystal display.

22. The method of claim 21 wherein positioning the linearly polarizing filter comprises positioning the linearly polarizing filter in a location selected from the group: adjacent to a lens of a lens of the optical media recorder; behind a shutter of the optical media recorder, in front of the shutter of the optical media recorder, adjacent to an image plane of the optical media recorder.

23. The method of claim 21 further comprising cleaning the top surface of the second transparent media of an adhesive layer.

24. The method of claim 21 wherein orientating the linearly polarizing filter comprises orientating the polarizing direction of the linearly polarizing filter relative to a polarizing direction of the second linearly polarizing film from an orientation selected from the group: orthogonal, parallel.

25. The method of claim 24 wherein orientating the linearly polarizing filter comprises orientating the polarizing direction of the linearly polarizing filter relative to a polarizing direction of the first linearly polarizing film from an orientation selected from the group: perpendicular, parallel.

26. The method of claim 21 wherein removing the second linearly polarizing film further comprises cleaning the top surface of the second transparent media with a solution comprising glycol ether, propanol.

27. The method of claim 21
wherein orientating the polarizing direction of the linearly polarizing filter relative to the liquid crystal display in a first orientation configures the optical media recorder to receive positive polarity images; and
wherein orientating the polarizing direction of the linearly polarizing filter relative to the liquid crystal display in a second orientation configures the optical media recorder to receive negative polarity images.

* * * * *